United States Patent
Cai

(10) Patent No.: US 10,402,479 B2
(45) Date of Patent: *Sep. 3, 2019

(54) METHOD, SERVER, BROWSER, AND SYSTEM FOR RECOMMENDING TEXT INFORMATION

(71) Applicant: TENCENT TECHNOLOGY (SHENZHEN) COMPANY LIMITED, Shenzhen (CN)

(72) Inventor: Bing Cai, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/002,855

(22) Filed: Jun. 7, 2018

(65) Prior Publication Data

US 2018/0285331 A1     Oct. 4, 2018

Related U.S. Application Data

(63) Continuation of application No. 14/447,330, filed on Jul. 30, 2014, now Pat. No. 10,019,419, which is a continuation of application No. PCT/CN2014/071610, filed on Jan. 28, 2014.

(30) Foreign Application Priority Data

Jun. 6, 2013 (CN) .......................... 2013 1 0223473

(51) Int. Cl.
*G06F 16/00* (2019.01)
*G06F 17/22* (2006.01)
(Continued)

(52) U.S. Cl.
CPC ........ *G06F 17/2247* (2013.01); *G06F 16/951* (2019.01); *G06F 17/241* (2013.01);
(Continued)

(58) Field of Classification Search
CPC .... G06F 17/30864; G06F 17/22; G06F 17/30; G06F 17/241; G06F 17/30321;
(Continued)

(56) References Cited

U.S. PATENT DOCUMENTS 7,801,885 B1    9/2010  Verma
2005/0262428 A1* 11/2005  Little ................. G06F 16/9535
715/201

(Continued)

FOREIGN PATENT DOCUMENTS

CN       101178728 A     5/2008
CN       101968802 A     2/2011
(Continued)

*Primary Examiner* — Quoc A Tran
(74) *Attorney, Agent, or Firm* — Anova Law Group, PLLC

(57) ABSTRACT

A method for recommending text information, a server, a browser, and a system thereof are provided. The method includes: a keyword is obtained by a server from a text index pool in response to a visiting request for a webpage from a browser; a recommended text information list is obtained from the text index pool according to the corresponding keyword; the recommended text information list is embedded into the webpage and the webpage is returned to the browser for displaying to a user; and the user may click the keyword to obtain the recommended text information list as required, thereby the keyword is set as the connection between the user and the webpage text information.

20 Claims, 9 Drawing Sheets

(51) Int. Cl.
*G06F 17/24* (2006.01)
*G06Q 30/02* (2012.01)
*G06F 16/951* (2019.01)
*G06F 16/9535* (2019.01)
*G06F 17/00* (2019.01)

(52) U.S. Cl.
CPC .......... *G06F 16/00* (2019.01); *G06F 16/9535* (2019.01); *G06F 17/22* (2013.01); *G06Q 30/02* (2013.01); *G06Q 30/0251* (2013.01); *G06Q 30/0255* (2013.01); *G06Q 30/0256* (2013.01); *G06Q 30/0267* (2013.01)

(58) Field of Classification Search
CPC .............. G06F 17/30867; G06Q 30/02; G06Q 30/0256; G06Q 30/0251; G06Q 30/0255; G06Q 30/0267
See application file for complete search history.

(56) References Cited

U.S. PATENT DOCUMENTS

| | | | |
|---|---|---|---|
| 2010/0076991 | A1* | 3/2010 | Nakano ................ G06Q 30/00 707/759 |
| 2012/0246561 | A1 | 9/2012 | Doig et al. |
| 2013/0036191 | A1 | 2/2013 | Fink et al. |
| 2013/0066902 | A1* | 3/2013 | Iida ...................... G06F 16/951 707/769 |
| 2014/0281858 | A1 | 9/2014 | Yi et al. |

FOREIGN PATENT DOCUMENTS

| | | |
|---|---|---|
| CN | 102629273 A | 8/2012 |
| CN | 102693271 A | 9/2012 |
| CN | 102708132 A | 10/2012 |
| CN | 102761627 A | 10/2012 |
| CN | 102768685 A | 11/2012 |

* cited by examiner

| URL | http://tech.qq.com/a/20120930/000067.htm?from=qq |
|---|---|
| Title of the webpage | The global staff reduction of Sharp may influence China, 5000 people got fired in Japan - Technology -Tencent |
| Keyword | Sharp, 32.24965    Staff reduction, 22.75728 |

| Science & Tech | Industry Column |

Apple's apology in China part of a "rite of passage" for foreign companies 2013-04-03  13:57

International companies trying to break in to the Chinese market are routinely criticized by state-controlled media, forcing apologies like the one Apple Chief Executive Tim Cook gave this week.

The so-called "rite of passage" for foreign companies in China was profiled on Tuesday by Bloomberg, which noted that corporations such as Volkswagen AG, Carrefour SA, and Yum! Brands Inc. have also been targeted by the government-controlled China Central Television. Apple specifically was under fire for failing to replace the back covers of iPhone 4 and iPhone 4S units after repairing the electronics inside, which prompted weeks of criticism from the state-run media.

Following the CCTV report, another state-run media organization, the People's Daily newspaper, ran more than a dozen articles that also targeted Apple.

Those attacks pushed Cook to issue a formal apology on Apple's website on Monday. The CEO said that a number of "misunderstandings" over the company's warranty policies had occurred, while revealing changes that aim to better serve iPhone customers.

FIG. 7

| Science & Tech | Industry Column |

Apple's apology in China part of a "rite of passage" for foreign companies 2013-04-03   13:57

International companies trying to break in to the Chinese market are routinely criticized by state-controlled media, forcing apologies like~~~~~~~~~~~~~~~~~~~~~~~~~~~~~~~~~~~~~~~~~~~~~~~~~~~~~~~~~

| Browser recommends | ✕ |
|---|---|
| Apple | add |
| Apple's share price cut dissatisfied shareholders. Is Apple Looking For A Replacement For CEO Cook? | |
| 5 Things You Should Know About Apple's Earnings | |
| Apple's WWDC 2013: What to expect | |
| Apple Faces Dilemma Over Strategy in China | |
| More >> | |

Those attacks pushed Cook to issue a formal apology on Apple's website on Monday. The CEO said that a number of "misunderstandings" over the company's warranty policies had occurred, while revealing changes that aim to better serve iPhone customers.

FIG. 8

METHOD, SERVER, BROWSER, AND SYSTEM FOR RECOMMENDING TEXT INFORMATION

This application is a continuation application of U.S. patent application Ser. No. 14/447,330, filed on Jul. 30, 2014; and U.S. patent application Ser. No. 14/447,330 claims priority to and is a continuation of PCT/CN2014/071610, filed on Jan. 28, 2014 and entitled "METHOD, SERVER, BROWSER, AND SYSTEM FOR RECOMMENDING TEXT INFORMATION", which claims priority to Chinese Patent Application No. 201310223473.3, entitled "METHOD, SERVER, BROWSER, AND SYSTEM FOR RECOMMENDING TEXT INFORMATION", filed with State Intellectual Property Office of PRC on Jun. 6, 2013, all of which are incorporated herein by reference in their entireties.

TECHNICAL FIELD

The present disclosure relates to the technical field of internet, and in particular to a method, a server, a browser and a system for recommending text information based on a keyword.

BACKGROUND

At present, a corresponding text on a webpage is recommended to a user by generating a relevant text at the bottom of the webpage manually or automatically.

In an existing method for recommending a text, the similarity between a new text and an original text is calculated when the corresponding text is generated. The time required for calculating will grow with accumulation of the text. This will cause information overload and the text can not be recommended to the user timely.

Additionally, an appropriate information dimension is not adopted in prior art, so that the function of subscribing critical information can not be offered to the user and the effect of recommending text information is reduced.

SUMMARY

It is an object of the embodiments of the disclosure to provide a method, server, browser, and system for recommending text information, for improving the efficiency and effectiveness of recommendation of text information.

According to an embodiment of the present disclosure, a method for recommending text information is provided. The method includes:

obtaining a keyword from a text index pool in response to a visiting request for a webpage from a browser;

obtaining a recommended text information list from a keyword index pool according to the keyword; and embedding the recommended text information list into the webpage and returning the webpage to the browser.

According to an embodiment of the present disclosure, it is further provided a server for recommending text information, which includes:

a keyword obtaining module, configured to obtain a keyword from a text index pool in response to a visiting request for a webpage from a browser;

a recommended information obtaining module, configured to obtain a recommended text information list from a keyword index pool according to the keyword; and a recommended information embedding module, configured to embed the recommended text information list into the webpage and return the webpage to the browser.

According to an embodiment of the present disclosure, it is further provided a browser for recommending text information, which includes:

a request sending module, configured to send to a server a visiting request for a webpage in the case where the webpage is visited by a user through the browser; and a display module, configured to receive the webpage in which a recommended text information list is embedded, and display the webpage to the user.

According to an embodiment of the present disclosure, it is further provided a system for recommending text information, which includes a browser and a server, where the browser is configured to send to a server a visiting request for a webpage in the case where the webpage is visited by a user through the browser;

the server is configured to receive the visiting request for the webpage from the browser, obtain a keyword from a text index pool in response to the visiting request, obtain a recommended text information list from a keyword index pool according to the keyword, and embed the recommended text information list into the webpage and return the webpage to the browser; and the browser is further configured to receive the webpage in which the recommended text information list is embedded, and display the webpage to the user.

BRIEF DESCRIPTION OF THE DRAWINGS

FIG. 7 is a diagram of an example of visiting a portal website through a QQ browser according to an embodiment of the present disclosure;

FIG. 8 is a schematic diagram of recommended text information after the marked keyword in the webpage shown in FIG. 7 has been clicked by a user;

To make the technical solutions of the disclosure more apparent, the embodiments of the present disclosure will now be described in detail with reference to the accompanying drawings.

DETAILED DESCRIPTION

The solution of the embodiment of the present disclosure is as follows. A keyword is obtained from a text index pool in response to a visiting request for a webpage from a browser; a recommended text information list is obtained from a keyword index pool according to the keyword; the recommended text information list is embedded into the webpage and the webpage is returned to the browser. A user may click the keyword to obtain the recommended text information list as required, thereby the webpage text information is recommended to a user by using the keyword. The information overload is reduced and the efficiency and effectiveness of recommendation of text information is improved without considerable modification of the original webpage.

In the embodiment of the disclosure, the keyword is set as the connection between the user and the webpage text information, a scheme for corresponding text recommending based on the keyword without considerable modification of the original webpage is provided.

Specifically, the keyword, which is referred to as TAG, label, or the like, is generally the mark of the text made by the user or generated by a program automatically. The keyword is a brief description of the main subject of a text and is widely used in text subject extraction, information organizing, and user interest description and the like. For example, every book and movie in www.douban.com has a TAG made by the user. According to the popular website delicious, users are allowed to tag the webpage they collect. At present, mainstream Apps for news, such as ZHIYUE and zaker, each has the function of displaying the keyword that represents the dimension of news. Therefore, connecting the user and the text by appropriate interact approach with the keyword will not only reduce information overload but also describe the interests of the user so as to recommend personalized information.

Figure 1:
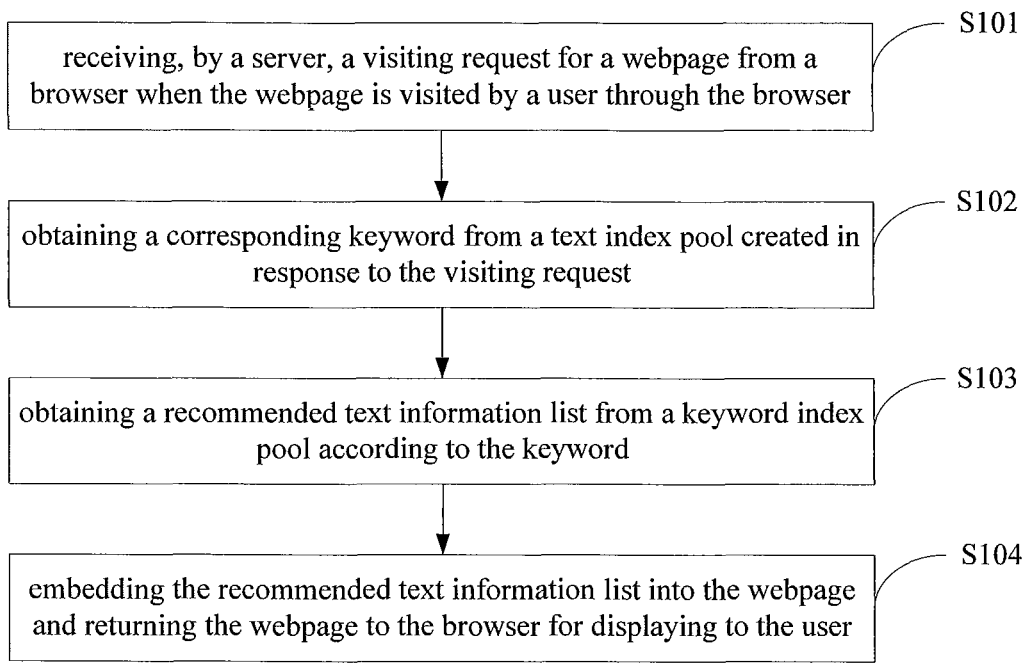
FIG. 1 is a flow chart of a method for recommending text information according to a first embodiment of the present disclosure.

Particularly, it is provided a method for recommending text information in a an embodiment of the present disclosure as shown in FIG. 1, which includes the following steps S101 to S104.

Step S101 may include receiving, by a server, a visiting request for a webpage from a browser when the webpage is visited by a user through the browser.

When the webpage is visited by the user through the browser, the visiting for the webpage is carried out by sending the visiting request to the server by the browser. The information, such as uniform resource locator (URL), which is also referred to as the address of a webpage), of the webpage to be visited is included in the visiting request.

Step S102 may include obtaining a keyword from a text index pool in response to the visiting request.

Step S103 may include obtaining a recommended text information list from a keyword index pool according to the keyword.

In the present embodiment, the text index pool and the keyword index pool are created beforehand. A relationship between the URL of the recommended webpage text selected from historical webpages of the browser and the corresponding keyword in the recommended webpage text is stored in the text index pool and the keyword index pool.

The text index pool is formed by a Key (a text index key field) and a Value (the value of the text index key field), and for each recommended webpage text, the key (the text index key field) which is the URL of the recommended webpage text and the value (the value of the text index key field) which is the keyword of the recommended webpage text are stored in pair to form the text index pool.

The keyword index pool is formed by the Key (the text index key field) and the Value (the value of the text index key field), and for each recommended webpage text, a key which is the keyword of the recommended webpage text and a value which is the URL of the recommended webpage text are stored in pair to form the keyword index pool.

The corresponding keyword is obtained by the server from a text index pool created beforehand in response to the visiting request when the webpage is visited by the user through the browser; then a predetermined number of URLs of the recommended webpage text is obtained by the server from the keyword index pool created beforehand according to the corresponding keyword; and thus a recommended text information list which consists of the URLs of a plurality of recommended webpage texts is obtained.

Step S104 may include embedding the recommended text information list into the webpage and returning the webpage to the browser for displaying to the user.

The recommended text information list is linked with a keyword at a corresponding position in the webpage and the keyword at the corresponding position is marked.

The way for marking the keyword at the corresponding position includes but not limited to: highlighting the keyword; displaying the keyword in a color that is different from that of the adjacent words; adding a set icon beside the keyword; or underlining the keyword.

The user may click the marked keyword in the webpage to obtain the recommended text information list according to his/her own needs or interests when visiting the marked webpage displayed by the browser so as to browse the recommended text quickly.

Figure 2:
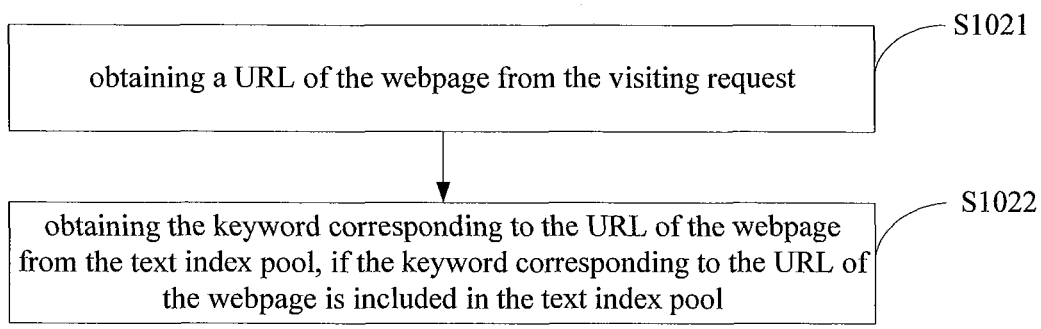
FIG. 2 is a flow chart of obtaining a corresponding keyword from a text index pool created in response to a visiting request according to an embodiment of the present disclosure.

Particularly, according to an embodiment, the above step of obtaining a keyword from a text index pool created in response to the visiting request, as shown in FIG. 2, may include the following steps S1021 to S1022.

Step S1021 may include obtaining a uniform resource locator (URL) of the webpage from the visiting request.

Step S1022 may include obtaining the keyword corresponding to the URL of the webpage from the text index pool, if the keyword corresponding to the URL of the webpage is included in the text index pool.

Where, if the keyword corresponding to the URL of the webpage is included in the text index pool, the keyword corresponding to the URL of the webpage is obtained from the text index pool; if the keyword corresponding to the URL of the webpage is not included in the text index pool, the procedure is ended.

According to the above scheme of the present embodiment, a keyword is obtained by a server from a text index pool in response to the visiting request when the webpage is visited by a user through the browser; a recommended text information list is obtained from the text index pool according to the corresponding keyword; the recommended text information list is embedded into the webpage and the webpage is returned to the browser for displaying to the user; and the user may click the keyword to obtain the recommended text information list as required, thereby the keyword is set as the connection between the user and the webpage text information. The information overload is reduced and the efficiency and effectiveness of recommendation of text information is improved without considerable modification of the original webpage, and the requirement of the user for quick viewing the webpage is met. In addition, the online interaction sequence of the responding of the server and the browser to the visiting of the user for the webpage is a real-time interaction which lasts a very short period of time (for instance, less than 10 ms) so as not to affect the display speed of the original webpage.

Figure 3:
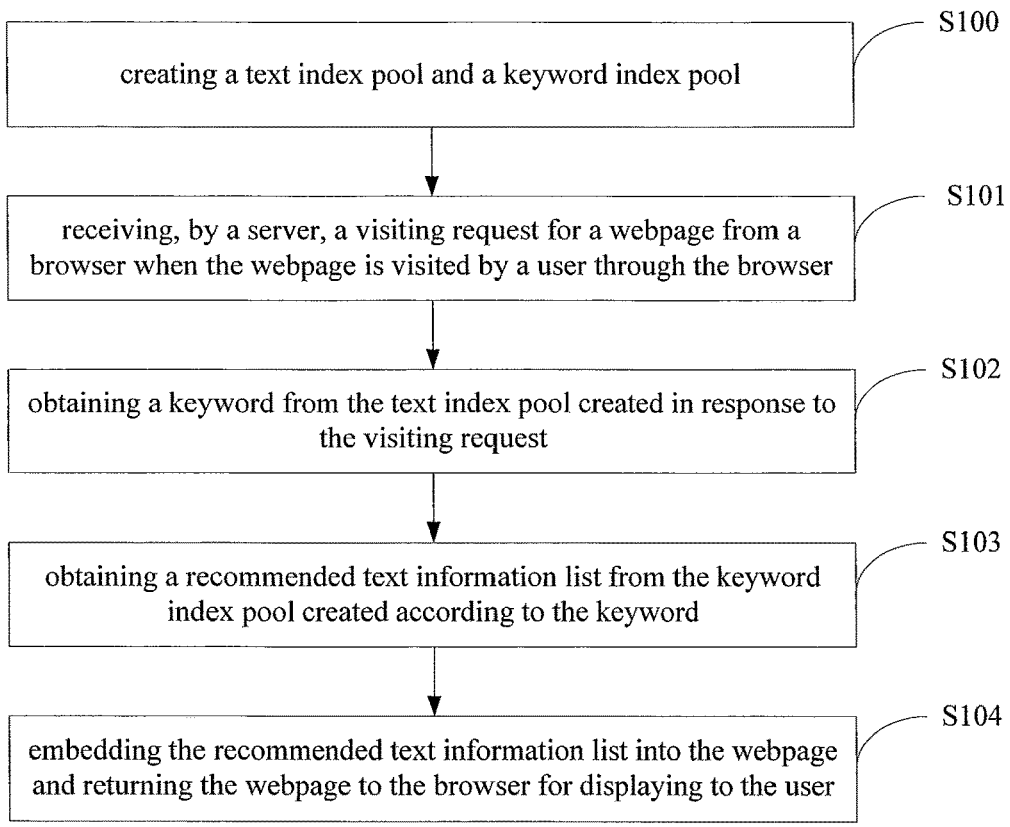
FIG. 3 is a flow chart of a method for recommending text information according to a second embodiment of the present disclosure.

As shown in FIG. 3, it is provided another method for recommending text information according to an embodiment of the present disclosure. Based on the above embodiment, before the step S101 of receiving, by a server, a visiting request for a webpage from a browser when the webpage is visited by a user through the browser, the method further includes step S100.

Step S100 may include creating the text index pool and the keyword index pool.

The present embodiment is different from the first embodiment in that the present embodiment further includes the scheme of creating the text index pool and the keyword index pool to facilitate the server obtaining the recommended text information list based on the created text index pool and keyword index pool.

Figure 4:
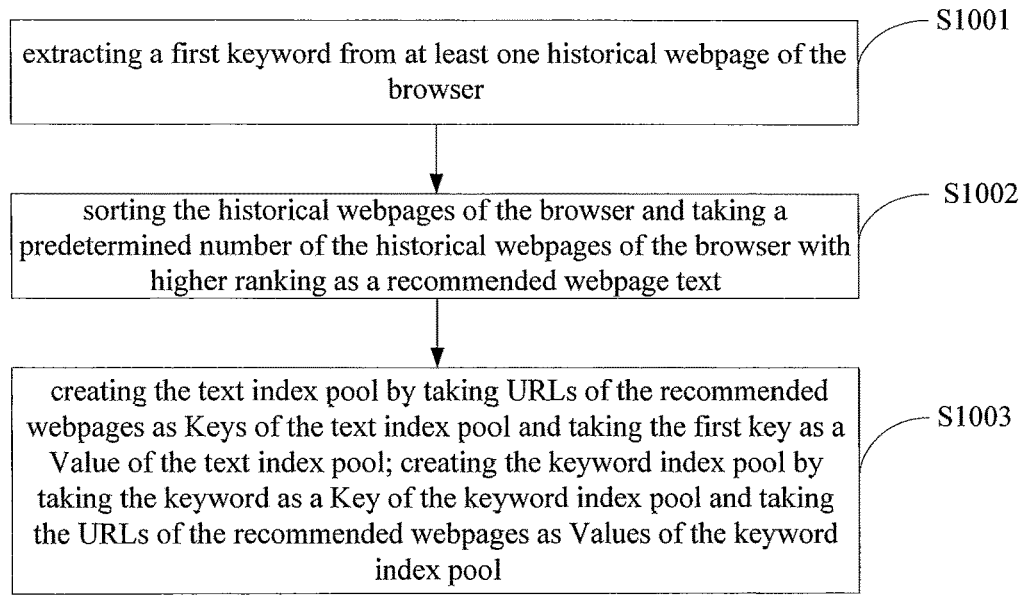
FIG. 4 is a flow chart of creating a text index pool and a keywords index pool according to an embodiment of the present disclosure.

Particularly, as shown in FIG. 4, the above step S100, creating the text index pool and the keyword index pool may include the following steps S1001 to S1003.

Step S1001 may include extracting a first keyword from at least one historical webpage of the browser.

According to an embodiment, the step S1001 may include: extracting a main text from the historical webpage of the browser; performing word segmentation on the extracted main text to obtain candidate keywords; counting information of each of the candidate keywords, such as a word frequency and a distribution parameter of each of the candidate keywords, and calculating a weight of each of the candidate keywords; and setting a candidate keyword of which the weight is greater than a predetermined threshold as the first keyword.

The predetermined threshold may be set according to a specific situation.

The formula for calculating the weight of the candidate keyword is $W_{keyword}=TF*D$, where TF is the word frequency of the candidate keyword, and D is the distribution parameter of the candidate keyword in the text, and has a value between 0 and 1.

Figures 5, 6:
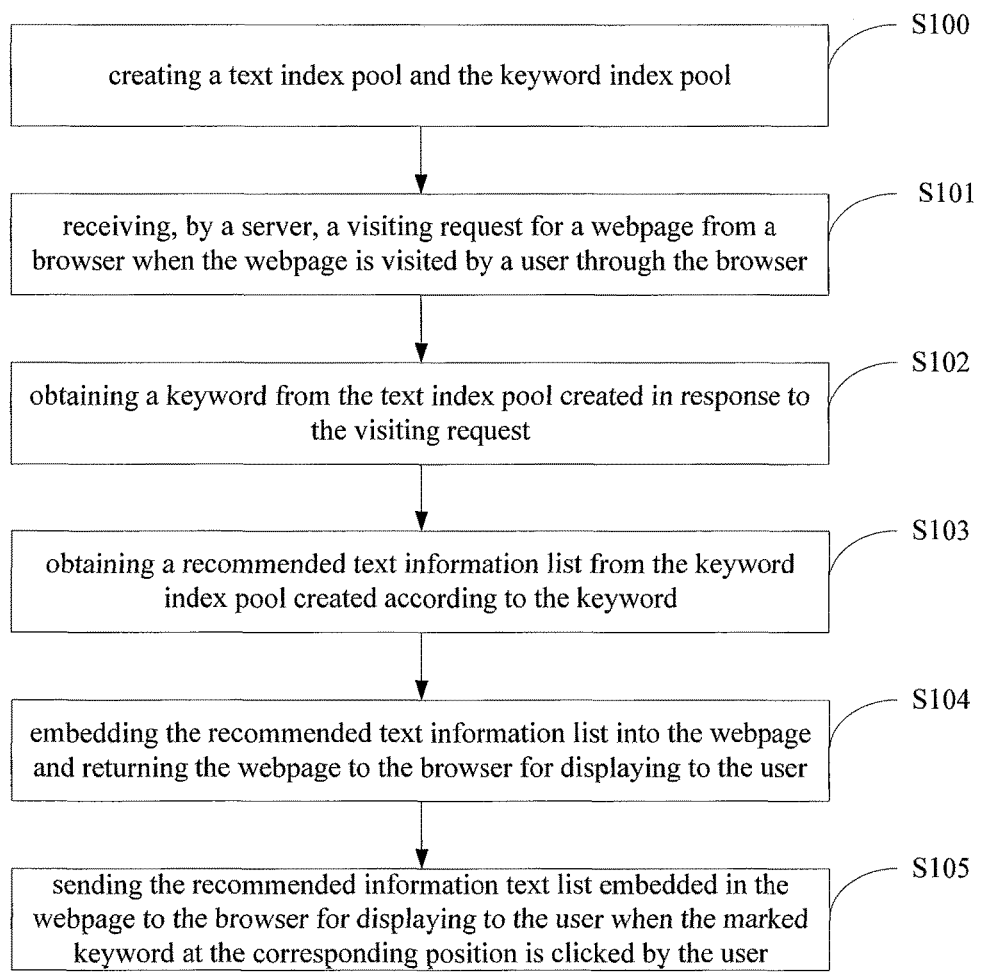
FIG. 5 is a schematic diagram of an example of extracting a keywords from a webpage according to an embodiment of the present disclosure.
FIG. 6 is a flow chart of a method for recommending text information according to a third embodiment of the present disclosure.

FIG. 5 shows an example of extracting a keyword from a historical webpage.

The keywords are "sharp" and "staff reduction" which have a weight of 32.24695 and 22.75728 respectively.

Step S1002 may include sorting the historical webpages of the browser and taking a predetermined number of the historical webpages of the browser with higher ranking as a recommended webpage text.

Commonly a large number of texts (usually hundreds of texts) are related to each keyword and only preferred several texts (e.g. about 5 texts) are recommended to the user. So hundreds of texts should be sorted in a predetermined way and the preferred texts are recommended to the user.

As an embodiment, the number of hits of a text and an updating time of a text are taken as parameters to calculate a text weight of the historical webpage of the browser; and a predetermined number of historical webpages of the browser with a larger weight are set as recommended webpages.

The formula for sorting may be:

$$W_{webpage} = \frac{PV}{T-t},$$

where PV is the number of hits, T is the current time, and t is the time when the text is updated. It is known from the above formula that the greater the number of hits, or the shorter a duration between the current time and the time when the text is updated, the higher the ranking it would have.

Step S1003 may include creating the text index pool by taking URLs of the recommended webpages as Keys of the text index pool and taking the first key as a Value of the text index pool; creating the keyword index pool by taking the keyword as a Key of the keyword index pool and taking the URLs of the recommended webpages as Values of the keyword index pool.

According to the above scheme of the present embodiment, the creation of the text index pool and the keyword index pool is achieved. The server may obtain the recommended text information list according to the text index pool and the keyword index pool.

As shown in FIG. 6, it is provided another method for recommending text information according to an embodiment of the present disclosure. Based on the above embodiment, after the step S101, the method further include:

step S105 including sending the recommended information text list embedded in the webpage to the browser for displaying to the user when the marked keyword at the corresponding position is clicked by the user.

The present embodiment is different from the above embodiment in that the user may click the marked keyword in the webpage to obtain the recommended text information list according to his/her own needs or interests.

Particularly, the recommended text information list is embedded into the webpage and sent to the browser for displaying to the user by the server when the marked keyword in the corresponding position has been clicked by the user. The user may click the marked keyword to obtain the corresponding text information for browsing or subscription if the user is interested in the recommended information. Therefore, according to the scheme of recommending text based on the keyword, it is provided effective support to increase click-through rate of the user, optimize reading experience of the user, and describe interests of the user.

The implementation of the scheme of the present embodiment in a QQ browser is described hereinafter.

The webpage returned to the browser after being recommended by the server when the user visits a portal website through the QQ browser is shown in FIG. 7. The "Apple", which is taken as the keyword for this webpage, is marked and is available for the user to click.

A recommended window which contains a subscription button and the recommended text related to "Apple" as shown in FIG. 8 will pop out after the user has clicked the keyword "Apple" if the user is interested in this topic.

According to the above scheme of the present embodiment, a corresponding keyword is obtained by a server from a text index pool in response to the visiting request when the webpage is visited by a user through the browser; a recommended text information list is obtained from the text index pool according to the corresponding keyword; the recommended text information list is embedded into the webpage and the webpage is returned to the browser for displaying to the user; and the user may click the keyword to obtain the recommended text information list as required, thereby the keyword is set as the connection between the user and the webpage text information. The information overload is reduced and the efficiency and effectiveness of recommendation of text information is improved without considerable modification of the original webpage, and the requirement of the user for quick viewing the webpage is met. In addition, the online interaction sequence of the responding of the server and the browser to the visiting of the user for the webpage is a real-time interaction which lasts a very short period of time (for instance, less than 10 ms) so as not to affect the display speed of the original webpage.

According to an embodiment of the present disclosure, it is provided a server for recommending text information, which includes: a keyword obtaining module, a recommended information obtaining module, and a recommended information embedding module.

The key keyword obtaining module is configured to obtain a keyword from a text index pool in response to a visiting request for a webpage from a browser.

The recommended information obtaining module is configured to obtain a recommended text information list from a keyword index pool according to the keyword.

The recommended information embedding module is configured to embed the recommended text information list into the webpage and return the webpage to the browser.

With the server provided in the embodiment of the present disclosure, the webpage text information is recommended to user by using the key word. Therefore, the information overload is reduced and the efficiency and effectiveness of recommendation of text information is improved without considerable modification of the original webpage.

Figure 9:
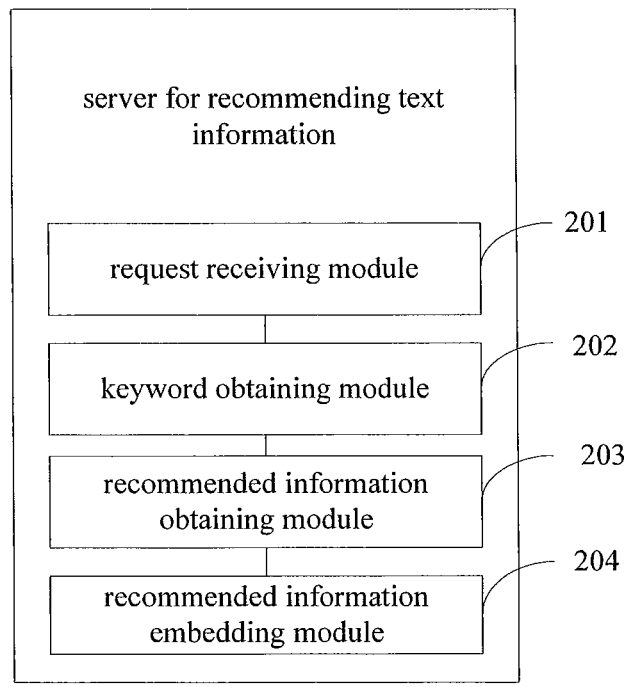
FIG. 9 is a schematic structural diagram of a server for recommending text information according to the first embodiment of the present disclosure.

As shown in FIG. 9, it is provided another server for recommending text information, which includes: a request receiving module 201, a keyword obtaining module 202, a recommended information obtaining module 203 and a recommended information embedding module 204.

The request receiving module 201 is configured to receive a visiting request for a webpage from a browser when the webpage is visited by a user through the browser.

The keyword obtaining module 202 is configured to obtain a keyword from a text index pool in response to the visiting request.

The recommended information obtaining module 202 is configured to obtain a recommended text information list from a keyword index pool according to the keyword.

The recommended information embedding module 204 is configured to embed the recommended text information list into the webpage and return the webpage to the browser.

When the webpage is visited by the user through the browser, the visiting for the webpage is carried out by sending the visiting request to the request receiving module 201 of the server by the browser. The information, such as uniform resource locator, of the webpage to be visited is included in the visiting request.

In the present embodiment, the text index pool and the keyword index pool are created beforehand. A relationship between the URL of the recommended webpage text selected from historical webpages of the browser and the corresponding keyword in the recommended webpage text is stored in the text index pool and the keyword index pool.

The text index pool is formed by a Key (a text index key field) and a Value (the value of the text index key field), and for each recommended webpage text, the key (the text index key field) which is the URL of the recommended webpage text and the value (the value of the text index key field) which is the keyword of the recommended webpage text are stored in pair to form the text index pool.

The keyword index pool is formed by the Key (the text index key field) and the Value (the value of the text index key field), and for each recommended webpage text, a key which is the keyword of the recommended webpage text and a value which is the URL of the recommended webpage text are stored in pair to form the keyword index pool.

The corresponding keyword is obtained by the keyword obtaining module 202 of the server from a text index pool created beforehand in response to the visiting request when the webpage is visited by the user through the browser; then a predetermined number of the URLs of the recommended webpage text are obtained by the recommended information obtaining module 203 of the server from the keyword index pool created beforehand according to the corresponding keyword to get the recommended text information list which consists of a number of the URL of the recommended webpage.

Then the recommended text information list is linked with a keyword at a corresponding position in the webpage by the recommended information embedding module 204 and the keyword at the corresponding position is marked.

The way for marking the keyword at the corresponding position includes but not limited to: highlighting the keyword; or displaying the keyword in a color that is different from that of the adjacent words; or adding a set icon beside the keyword; or underlining the keyword.

The user may click the marked keyword in the webpage to obtain the recommended text information list according to his/her own needs or interests when visiting the marked webpage displayed by the browser so as to browse the recommended text quickly.

Figure 10:
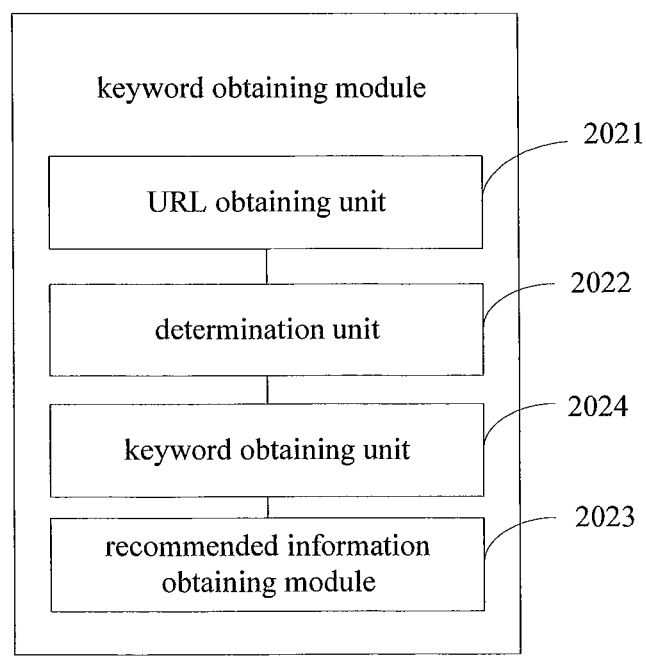
FIG. 10 is a schematic structural diagram of a keyword obtaining module according to an embodiment of the present disclosure.

Particularly, as an embodiment shown in FIG. 10, the keyword obtaining module 202 may includes: a URL obtaining unit 2021, and a keyword obtaining unit 2022.

The URL obtaining unit 2021 is configured to obtain a URL of the webpage from the visiting request.

The keyword obtaining unit 2022 is configured to obtain the keyword corresponding to the URL of the webpage from the text index pool.

The keyword obtaining module 202 further includes a determination unit 2023.

The determination unit 2023 is configured to determine whether the keyword corresponding to the URL of the webpage is included in the text index pool; if the keyword corresponding to the URL of the webpage is included in the text index pool, the keyword corresponding to the webpage is obtained by the keyword obtaining unit 2022.

According to the above scheme of the present embodiment, a keyword is obtained by a server from a text index pool in response to the visiting request when the webpage is visited by the user through the browser; a recommended text information list is obtained from the text index pool according to the corresponding keyword; the recommended text information list is embedded into the webpage and the webpage is returned to the browser for displaying to the user; and the user may click the keyword to obtain the recommended text information list as required, thereby the keyword is set as the connection between the user and the webpage text information. The information overload is reduced and the efficiency and effectiveness of recommendation of text information is improved without considerable modification of the original webpage, and the requirement of the user for quick viewing the webpage is met. In addition, the online interaction sequence of the responding of the server and the browser to the visiting by the user for the webpage is a real-time interaction which lasts a very short period of time (for instance, less than 10 ms) so as not to affect the display speed of the original webpage.

Figure 11:
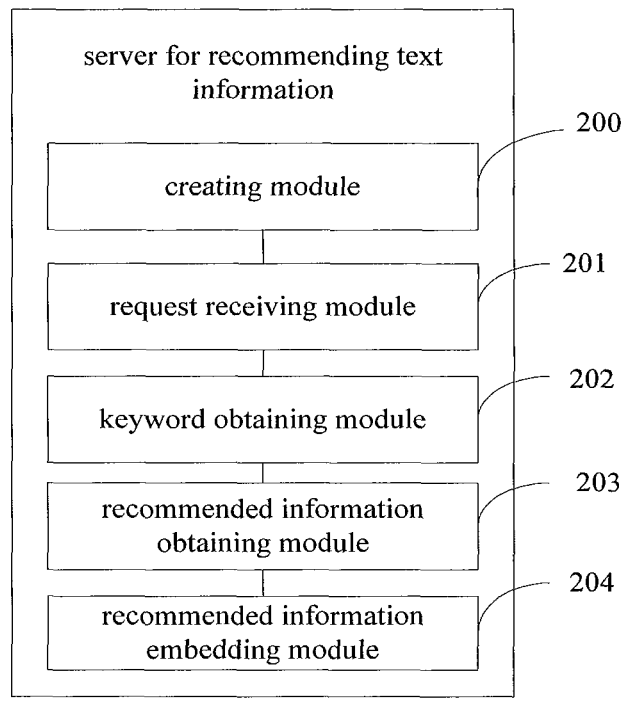
FIG. 11 is a schematic structural diagram of a server for recommending text information according to the second embodiment of the present disclosure.

As shown in FIG. 11, it is provided another server for recommending text information. Based on the server provided in the above embodiment, the server further includes:

a creating module 200, configured to create the text index pool and the keyword index pool.

With the text index pool and the keyword index pool created by the creating module 200, the server can obtain the recommended text information list based on the created text index pool and keyword index pool.

Figure 12:
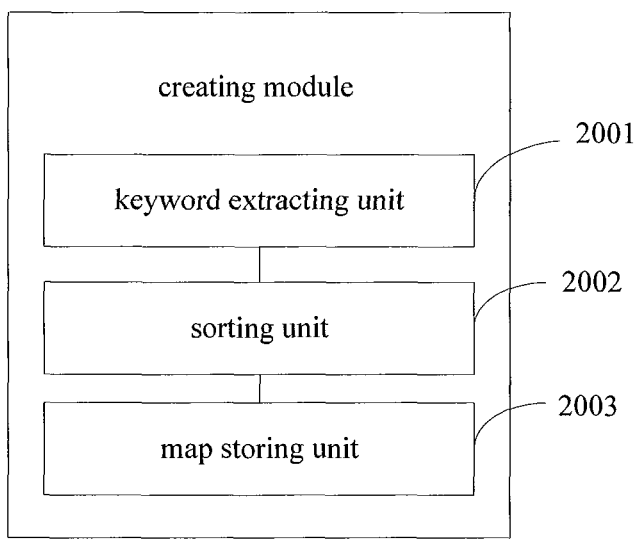
FIG. 12 is a schematic structural diagram of a creating module according to an embodiment of the present disclosure.

Particularly, as shown in FIG. 12, the above creating module 200 may include: a keyword extracting unit 2001, a sorting unit 2002, and a map storing unit 2003.

The keyword extracting unit 2001 is configured to extract a keyword from at least one historical webpage of the browser.

The sorting unit 2002 is configured to sort the historical webpages of the browser and take a predetermined number of the historical webpages with higher ranking as a recommended webpage text.

The map storing unit 2003 is configured to create the text index pool by taking URLs of the recommended webpages as Keys of the text index pool and taking the first key as a Value of the text index pool, and create the keyword index pool by taking the keyword as a Key of the keyword index pool and taking the URLs of the recommended webpages as Values of the keyword index pool.

The keyword extracting unit 2001 is further configured to extract a main text from the historical webpage of the browser, perform word segmentation on the extracted main text to obtain candidate keywords, count a word frequency and a distribution parameter of each of the candidate keywords and calculate a weight of each of the candidate keywords; and set a candidate keyword of which the weight is greater than a predetermined threshold as the extracted keyword from the historical webpage of the browser.

The predetermined threshold may be set according to a specific situation.

The formula for calculating the weight of the candidate keyword is $W_{keyword}=TF*D$, where TF is the word frequency of the candidate keyword, and D is the distribution parameter of the candidate keyword in the text, and has a value between 0 and 1.

According to an embodiment, the sorting unit 2002 is further configured to calculate a text weight of the historical webpage of the browser in which the extracted keyword is contained by taking the number of hits of the text and an updating time of the text as parameters, and set a predetermined number of historical webpages of the browser with a larger text weight as a recommended webpage text.

Commonly a large number of texts (usually hundreds of texts) are related to each keyword and only preferred several texts (e.g. about 5 texts) are recommended to the user. So hundreds of texts should be sorted in a predetermined way and the preferred texts are recommended to the user.

As an embodiment, the number of hits of a text and an updating time of a text are taken as parameters to calculate a text weight of the historical webpage of the browser; and a predetermined number of historical webpages of the browser with a larger weight are set as recommended webpages.

The formula for sorting may be:

$$W_{webpage} = \frac{PV}{T-t}$$

where PV is the number of hits, T is the current time, and t is the time when the text is updated. It is known from the above formula that the greater the number of hits, or the shorter a duration between the current time and the time when the text is updated, the higher the ranking it would has.

According to the above scheme of the present embodiment, the creation of the text index pool and the keyword index pool is achieved. The server may obtain the recommended text information list according to the text index pool and the keyword index pool.

Figure 13:
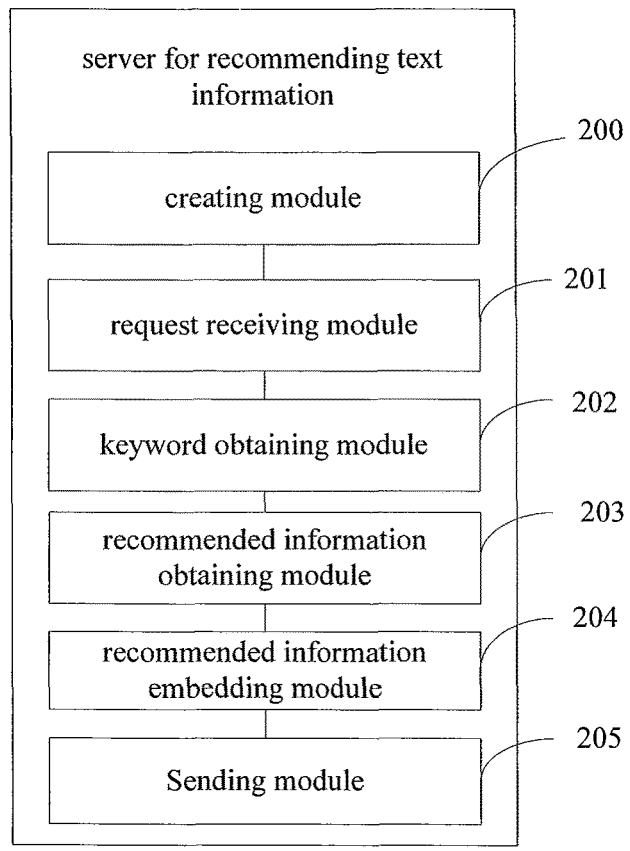
FIG. 13 is a schematic structural diagram of a server for recommending text information according to the third embodiment of the present disclosure.

As shown in FIG. 13, it is provided another server for recommending text information. Based on the aforementioned embodiment, the server further includes:

a sending module 205, configured to send the recommended information text list embedded in the webpage to the browser for displaying to the user when the marked keyword at the corresponding position is clicked by the user.

The present embodiment is different from the second embodiment in that the user may click the marked keyword in the webpage to obtain the recommended text information list according to his/her own needs or interests.

Particularly, the recommended text information list is embedded into the webpage and sent to the browser for displaying to the user by the server when the marked keyword in the corresponding position has been clicked by the user. The user may click the marked keyword to obtain the corresponding text information for browsing or subscription if the user is interested in the recommended information. Therefore, according to the scheme of recommending text based on the keyword, it is provided effective support to increase click-through rate of the user, optimize reading experience of the user, and describe interests of the user.

Figure 14:
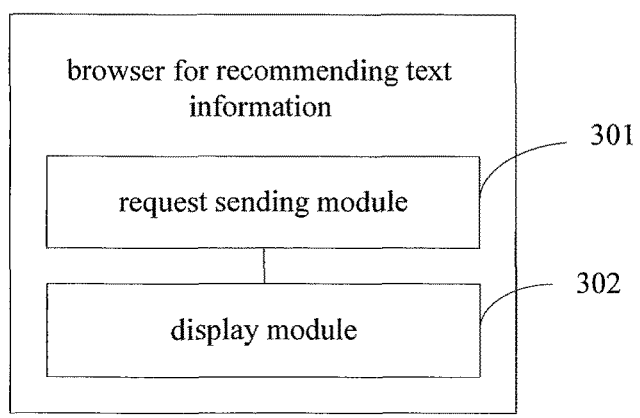
FIG. 14 is a schematic structural diagram of a preferred embodiment of a browser for recommending text information according to the present disclosure.

As shown in FIG. 14, it is provided a browser for recommending text information, which includes: a request sending module 301 and a display module 302.

The request sending module 301 is configured to send to a server a visiting request for a webpage when the webpage is visited by a user through the browser.

The display module 302 is configured to receive the webpage in which a recommended text information list is embedded, and display the webpage to the user.

The display module 302 is further configured to receive a click command from the user to click the keyword at a corresponding position of the browser.

Particularly, when the webpage is visited by the user through the browser, the visiting for the webpage is carried out by sending the visiting request to the server by the request sending module 301 of the browser. The information, such as uniform resource locator (URL, which is also referred to as the address of a webpage), of the webpage to be visited is included in the visiting request.

In the present embodiment, the text index pool and the keyword index pool are created beforehand by the server. A relationship between the URL of the recommended webpage text selected from historical webpages of the browser and the corresponding keyword in the recommended webpage is stored in the text index pool and the keyword index pool.

The text index pool is formed by a Key (a text index key field) and a Value (the value of the text index key field), and for each recommended webpage text, the key (the text index key field) which is the URL of the recommended webpage text and the value (the value of the text index key field) which is the keyword of the recommended webpage text are stored in pair to form the text index pool.

The keyword index pool is formed by the Key (the text index key field) and the Value (the value of the text index key field), and for each recommended webpage text, a key which is the keyword of the recommended webpage text and a value which is the URL of the recommended webpage text are stored in pair to form the keyword index pool.

The corresponding keyword is obtained by the server from a text index pool created beforehand in response to the visiting request when the webpage is visited by the user through the browser; then a predetermined number of the URLs of the recommended webpage text are obtained by the server from the keyword index pool created beforehand according to the corresponding keyword; the recommended text information list is embedded into the webpage and the webpage is returned to the browser for displaying to the user; thus recommended text information list which consists of the URL of a plurality of recommended webpage texts is obtained.

Then the recommended text information list is linked with a keyword at a corresponding position in the webpage by the server and the keyword at the corresponding position is marked, and the recommended text information list is embedded into the webpage and the webpage is returned to the browser. The webpage is displayed to the user by the display module 302 of the browser.

The way for marking the keyword at the corresponding position includes but not limited to: highlighting the keyword; or displaying the keyword in a color that is different from that of the adjacent words; or adding a set icon beside the keyword; or underlining the keyword.

The user may click the marked keyword in the webpage to obtain the recommended text information list according to his/her own needs or interests when visiting the marked webpage displayed by the browser so as to browse the recommended text quickly.

Therefore, according to the above scheme of the present embodiment, a keyword is obtained by a server from a text index pool in response to the visiting request when the webpage is visited by a user thorough the browser; a recommended text information list is obtained from the text index pool according to the corresponding keyword; the recommended text information list is embedded into the webpage and the webpage is returned to the browser for displaying to the user; and the user may click the keyword to obtain the recommended text information list as required, thereby the keyword is set as the connection between the user and the webpage text information. The information overload is reduced and the efficiency and effectiveness of recommendation of text information is improved without considerable modification of the original webpage, and the requirement of the user for quick viewing the webpage is met. In addition, the online interaction sequence of the responding of the server and the browser to the visiting by the user for the webpage is a real-time interaction which lasts a very short period of time (for instance, less than 10 ms) so as not to affect the display speed of the original webpage.

Figure 15:
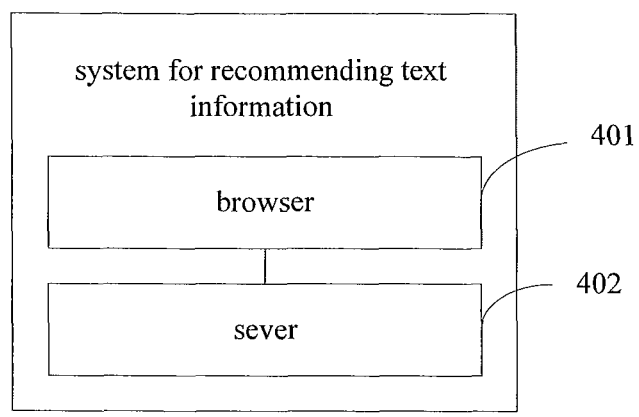
FIG. 15 is a schematic structural diagram of a preferred embodiment of a system for recommending text information according to the present disclosure.

As shown in FIG. 15, it is provided a system for recommending text information, which includes: a browser 401 and a server 402.

The browser 401 is configured to send to the server 402 a visiting request for a webpage from a user when the webpage is visited by a user through the browser 401.

The server 402 is configured to receive the visiting request for the webpage from the browser 401, obtain a keyword from a text index pool in response to the visiting request, obtain a recommended text information list from a keyword index pool according to the keyword, and embed the recommended text information list into the webpage and return the webpage to the browser 401.

The browser 401 is further configured to receive the webpage in which the recommended text information list is embedded, and display the webpage to the user.

The browser 401 is further configured to receive a click command from the user to click the keyword at a corresponding position of the browser.

In particular, when the webpage is visited by the user through the browser 401, the visiting for the webpage is carried out by sending a visiting request to the server 402 by the browser 401. The information, such as the URL, of the webpage to be visited is included in the visiting request.

In the present embodiment, the text index pool and the keyword index pool are created beforehand by the server 402. A relationship between the URL of the recommended webpage text selected from historical webpage of the browser and the corresponding keyword in the recommended webpage 401 is stored in the text index pool and the keyword index pool.

The text index pool is formed by a Key (the text index key field) and a Value (the value of the text index key field), and for each recommended webpage text, the key (the text index key field) which is the URL of the recommended webpage text and the value (the value of the text index key field) which is the keyword of the recommended webpage text are stored in pair to form the text index pool.

The keyword index pool is formed by the Key (the text index key field) and the Value (the value of the text index key field), and for each recommended webpage text, a key which is the keyword of the recommended webpage text and a value which is the URL of the recommended webpage text are stored in pair to form the keyword index pool.

The corresponding keyword is obtained by the server 402 from a text index pool created beforehand in response to the visiting request when the webpage is visited by the user through the browser 401; then a predetermined number of the URLs of the recommended webpage text are obtained by the server from the keyword index pool created beforehand according to the corresponding keyword; the recommended text information list is embedded into the webpage and the webpage is returned to the browser for displaying to the user; thus recommended text information list which consists of the URL of a plurality of recommended webpage texts is obtained.

Then the recommended text information list is linked with a keyword at a corresponding position in the webpage by the server 402 and the keyword at the corresponding position is marked, and the recommended text information list is embedded into the webpage and the webpage is returned to the browser 401. The webpage is displayed to the user by the browser 401.

The way for marking the keyword at the corresponding position includes but not limited to: highlighting the keyword; or displaying the keyword in a color that is different from that of the adjacent words; or adding a set icon beside the keyword; or underlining the keyword.

The user may click the marked keyword in the webpage to obtain the recommended text information list according to his/her own needs or interests when visiting the marked webpage displayed by the browser 401 so as to browse the recommended text quickly.

The server 402 is further configured to create the text index pool and the keyword index pool. The following scheme is adopted for creating the text index pool and the keyword index pool.

Firstly, a keyword is extracted from at least one historical webpage of the browser 401.

According to an embodiment, the step of extracting may include: extracting a main text from a historical webpage of the browser 401; performing word segmentation on the extracted main text to obtain candidate keywords; counting a word frequency and a distribution parameter of each of the candidate keywords and calculating a weight of each of the candidate keywords; and setting a candidate keyword of which the weight is greater than a predetermined threshold as the extracted keyword from the historical webpage of the browser 401.

The predetermined threshold may be set according to a specific situation.

The formula for calculating the weight of the candidate keyword is $W_{keyword}=TF*D$, where TF is the word frequency of the candidate keyword, and D is the distribution parameter of the candidate keyword in the text, and has a value between 0 and 1.

Then, the historical webpages of the browser 401 in which the extracted keyword is contained are sorted in a predetermined way and a predetermined number of historical webpages of the browser 401 with higher ranking is extracted as a recommended webpage text;

Commonly a large number of texts (usually hundreds of texts) are related to each keyword and only preferred several texts (e.g. about 5 texts) are recommended to the user. So hundreds of texts should be sorted in a predetermined way and the preferred texts are recommended to the user.

As an embodiment, the number of hits of a text and an updating time of a text are taken as parameters to calculate a text weight of the historical webpage of the browser 401; and a predetermined number of historical webpages of the browser 401 with a larger weight are set as recommended webpages.

The formula for sorting may be:

$$W_{webpage} = \frac{PV}{T-t}$$

where PV is the number of hits, T is the current time, and t is the time when the text is updated. It is known from the above formula that the greater the number of hits, or the shorter a duration between the current time and the time when the text is updated, the higher the ranking it would has.

Finally, for each recommended webpage text, a key which is the URL of the recommended webpage text and a value which is the keyword of the recommended webpage text are stored in pair to form the text index pool, and a key which is the keyword of the recommended webpage text and a value which is the URL of the recommended webpage text are stored in pair to form the keyword index pool.

Thus, according to the above scheme of the present embodiment, the creation of the text index pool and the keyword index pool is achieved. The server 402 may obtain the recommended text information list according to the text index pool and the keyword index pool.

According to the above scheme of the present embodiment, a corresponding keyword is obtained by a server from a text index pool in response to the visiting request when the webpage is visited by the user through the browser; a recommended text information list is obtained from the text index pool according to the corresponding keyword; the recommended text information list is embedded into the webpage and the webpage is returned to the browser for displaying to the user; and the user may click the keyword to obtain the recommended text information list as required, thereby the keyword is set as the connection between the user and the webpage text information. The information overload is reduced and the efficiency and effectiveness of recommendation of text information is improved without considerable modification of the original webpage, and the requirement of the user for quick viewing the webpage is met. In addition, the online interaction sequence of the responding of the server and the browser to the visiting of the user for the webpage is a real-time interaction which lasts a very short period of time (for instance, less than 10 ms) so as not to affect the display speed of the original webpage.

Finally, it should be noted that the term "including", "comprising" or any other variations herein are intended to cover a non-exclusive inclusion, such that a number of elements including the process, method, article, or apparatus includes not only those elements, but also other elements not expressly listed or for such further including a process, method, article or set. Preparation inherent elements. In the case where no more restrictions, by the statement "includes a" qualified elements, not including said element out of the process, method, article or device is also the same as the other elements present.

Through the above description of the embodiments, it can be clearly understood by those skilled in the art that the present disclosure may be accomplished by software necessary hardware platform to achieve, of course, can all be implemented by hardware, but in many cases the former is a better embodiment. Based on this understanding, the technical solution of the present disclosure is to contribute BACKGROUND all or some of the software may be embodied in the form of products, the computer software product may be stored in a storage medium, such as ROM/RAM, disk, CD-ROM, including several instructions for making a computer device (may be a mobile phone, personal computer, a server, or network equipment) to perform the various embodiments of the present disclosure, or certain parts of an embodiment of the method described.

While the present disclosure provides an MS-focused business communication method, apparatus and system are described in detail in this article applies specifically a case on the principles of the disclosure and the embodiments described, the above description of the embodiment just to help understanding of the disclosure and the core idea; Meanwhile, persons of ordinary skill in the art, the idea according to the disclosure, in the specific embodiments and application scopes will change place, above, the present specification shall not be construed as limiting the present disclosure.

The above are only preferred embodiments of the present disclosure and are not intend to limit the scope of the present disclosure, and any equivalent structural transformation or equivalent processes, or other direct or indirect application in related arts using the present disclosure, the specification and the drawings fall within the scope of protection of the present disclosure.

The invention claimed is:

1. A method for recommending text information, comprising:
    extracting keywords from a plurality of webpages, including extracting a first keyword from at least one of the plurality of webpages, wherein each of the plurality of webpages corresponding to at least one of the keywords;
    obtaining multiple webpages corresponding to the first keyword;
    sorting the multiple webpages to obtain a sorting result;
    taking a predetermined number of the multiple webpages as recommended webpages corresponding to the first keyword based on the sorting result;
    creating a text index pool by taking Uniform Resource Locators (URLs) of the multiple webpages as Keys of the text index pool and taking the first keyword as a Value of the text index pool;
    creating a keyword index pool by taking the first keyword as a Key of the keyword index pool and taking the URLs of the recommended webpages as Values of the keyword index pool;
    obtaining, in response to a visiting request for a webpage at a URL, a target keyword corresponding to the URL of the webpage;
    obtaining a recommended text list corresponding to the target keyword from the keyword index pool; and
    embedding the recommended text list into the webpage.

2. The method according to claim 1, wherein extracting the first keyword from at least one of the plurality of webpages comprises:
    extracting a main text from a webpage of the plurality of webpages;
    performing word segmentation on the main text to obtain candidate keywords;
    counting a word frequency of each of the candidate keywords and a distribution parameter of each of the candidate keywords;
    calculating a weight of each of the candidate keywords based on the word frequency and the distribution parameter; and
    setting a candidate keyword of which the weight is greater than a predetermined threshold as the first keyword.

3. The method according to claim 1, wherein sorting the multiple webpages and taking the predetermined number of the multiple webpages as recommended webpages comprises:
    calculating a text weight of each of the multiple webpages by taking a number of historical hits and an updating time of each of the multiple webpages as parameters of each of the multiple webpages; and
    setting the predetermined number of multiple webpages as the recommended webpages based on text weights of the multiple webpages.

4. The method according to claim 1, further comprising:
    obtaining the recommended text list corresponding to the target keyword by querying the keyword index pool using the target keyword as a Key, wherein the recommended text list includes recommended webpages stored in the keyword index pool and correspond to the target keyword.

5. The method according to claim 1, wherein obtaining the target keyword corresponding to the URL of the webpage comprises:
    determining whether the text index pool includes the URL of the webpage by querying the text index pool using the URL of the webpage as a Key;
    obtaining the target keyword corresponding to the URL of the webpage from the text index pool if the text index pool includes the URL of the webpage; and
    obtaining the target keyword corresponding to the URL of the webpage by performing word segmentation and selecting a segmented word based on appearance frequency and distribution manner of the segmented word in the webpage if the text index pool does not include the URL of the webpage.

6. The method according to claim 1, wherein embedding the recommended text list into the webpage comprises:
    linking the recommended text list with the target keyword; and
    marking the target keyword at a corresponding position of the webpage.

7. The method according to claim 6, further comprising:
    in response to the target keyword being selected at the corresponding position of the webpage in a browser, sending the recommended text list embedded in the webpage to the browser for displaying.

8. A server for recommending text information, comprising a memory; and a processor coupled to the memory, and wherein the processor is configured to:
    extract keywords from a plurality of webpages, including extracting a first keyword from at least one of the plurality of webpages, wherein each of the plurality of webpages corresponding to at least one of the keywords;
    obtain multiple webpages corresponding to the first keyword;
    sort the multiple webpages to obtain a sorting result;
    take a predetermined number of the multiple webpages as recommended webpages corresponding to the first keyword based on the sorting result;
    create a text index pool by taking Uniform Resource Locators (URLs) of the multiple webpages as Keys of the text index pool and taking the first keyword as a Value of the text index pool;
    create a keyword index pool by taking the first keyword as a Key of the keyword index pool and taking the URLs of the recommended webpages as Values of the keyword index pool;
    obtain, in response to a visiting request for a webpage at a URL, a target keyword corresponding to the URL of the webpage;
    obtain a recommended text list corresponding to the target keyword from the keyword index pool; and
    embed the recommended text list into the webpage.

9. The server according to claim 8, wherein the processor is further configured to:
    extract a main text from a webpage of the plurality of webpages;
    perform word segmentation on the main text to obtain candidate keywords;
    count a word frequency of each of the candidate keywords and a distribution parameter of each of the candidate keywords;
    calculate a weight of each of the candidate keywords based on the word frequency and the distribution parameter; and
    set a candidate keyword of which the weight is greater than a predetermined threshold as the first keyword.

10. The server according to claim 8, wherein the processor is further configured to:
- calculate a text weight of each of the multiple webpages by taking a number of historical hits and an updating time of each of the multiple webpages as parameters of each of the multiple webpages; and
- set the predetermined number of multiple webpages as the recommended webpages based on text weights of the multiple webpages.

11. The server according to claim 8, wherein the processor is further configured to:
- obtain the recommended text list corresponding to the target keyword by querying the keyword index pool using the target keyword as a Key, wherein the recommended text list includes recommended webpages stored in the keyword index pool and correspond to the target keyword.

12. The server according to claim 8, wherein the processor is further configured to:
- determine whether the text index pool includes the URL of the webpage by querying the text index pool using the URL of the webpage as a Key;
- obtain the target keyword corresponding to the URL of the webpage from the text index pool if the text index pool includes the URL of the webpage; and
- obtain the target keyword corresponding to the URL of the webpage by performing word segmentation and selecting a segmented word based on appearance frequency and distribution manner of the segmented word in the webpage if the text index pool does not include the URL of the webpage.

13. The server according to claim 8, wherein the processor is further configured to:
- link the recommended text list with the target keyword; and
- mark the target keyword at a corresponding position of the webpage.

14. The server according to claim 8, wherein the processor is further configured to: in response to the target keyword being selected at the corresponding position of the webpage in a browser, send the recommended text list embedded in the webpage to the browser for displaying.

15. A non-transitory computer-readable storage medium storing computer program instructions that, when being executed by at least one processor, cause the at least one processor to perform:
- extracting keywords from a plurality of webpages, including extracting a first keyword from at least one of the plurality of webpages, wherein each of the plurality of webpages corresponding to at least one of the keywords;
- obtaining multiple webpages corresponding to the first keyword;
- sorting the multiple webpages to obtain a sorting result;
- taking a predetermined number of the multiple webpages as recommended webpages corresponding to the first keyword based on the sorting result;
- creating a text index pool by taking Uniform Resource Locators (URLs) of the multiple webpages as Keys of the text index pool and taking the first keyword as a Value of the text index pool;
- creating a keyword index pool by taking the first keyword as a Key of the keyword index pool and taking the URLs of the recommended webpages as Values of the keyword index pool;
- obtaining, in response to a visiting request for a webpage at a URL, a target keyword corresponding to the URL of the webpage;
- obtaining a recommended text list corresponding to the target keyword from the keyword index pool; and
- embedding the recommended text list into the webpage.

16. The storage medium according to claim 15, wherein extracting the first keyword from at least one of the plurality of webpages comprises:
- extracting a main text from a webpage of the plurality of webpages;
- performing word segmentation on the main text to obtain candidate keywords;
- counting a word frequency of each of the candidate keywords and a distribution parameter of each of the candidate keywords;
- calculating a weight of each of the candidate keywords based on the word frequency and the distribution parameter; and
- setting a candidate keyword of which the weight is greater than a predetermined threshold as the first keyword.

17. The storage medium according to claim 15, wherein sorting the multiple webpages and taking the predetermined number of the multiple webpages as recommended webpages comprises:
- calculating a text weight of each of the multiple webpages by taking a number of historical hits and an updating time of each of the multiple webpages as parameters of each of the multiple webpages; and
- setting the predetermined number of multiple webpages as the recommended webpages based on text weights of the multiple webpages.

18. The storage medium according to claim 15, wherein the computer program instructions further cause the at least one processor to perform:
- obtaining the recommended text list corresponding to the target keyword by querying the keyword index pool using the target keyword as a Key, wherein the recommended text list includes recommended webpages stored in the keyword index pool and correspond to the target keyword.

19. The storage medium according to claim 15, wherein obtaining the target keyword corresponding to the URL of the webpage comprises:
- determining whether the text index pool includes the URL of the webpage by querying the text index pool using the URL of the webpage as a Key;
- obtaining the target keyword corresponding to the URL of the webpage from the text index pool if the text index pool includes the URL of the webpage; and
- obtaining the target keyword corresponding to the URL of the webpage by performing word segmentation and selecting a segmented word based on appearance frequency and distribution manner of the segmented word in the webpage if the text index pool does not include the URL of the webpage.

20. The storage medium according to claim 15, wherein embedding the recommended text list into the webpage comprises:
- linking the recommended text list with the target keyword; and
- marking the target keyword at a corresponding position of the webpage.

* * * * *